US007965895B1

(12) United States Patent
Danskin et al.

(10) Patent No.: US 7,965,895 B1
(45) Date of Patent: Jun. 21, 2011

(54) SCREEN COMPRESSION (75) Inventors: John M. Danskin, Cranston, RI (US); Ziyad S. Hakura, Palo Alto, CA (US); Edward L. Riegelsberger, Fremont, CA (US); Jason M. Musicer, Santa Clara, CA (US); Stephen D. Lew, Sunnyvale, CA (US)

(73) Assignee: NVIDIA Corporation, Santa Clara, CA (US)

(*) Notice: Subject to any disclaimer, the term of this patent is extended or adjusted under 35 U.S.C. 154(b) by 984 days.

(21) Appl. No.: 11/837,336

(22) Filed: Aug. 10, 2007

Related U.S. Application Data (62) Division of application No. 10/435,073, filed on May 9, 2003, now Pat. No. 7,342,590.

(51) Int. Cl.
*G06K 9/36* (2006.01)
*G06K 9/46* (2006.01)

(52) U.S. Cl. .................. 382/232; 382/233; 382/244

(58) Field of Classification Search .............. 382/232, 382/233, 244
See application file for complete search history.

(56) References Cited

U.S. PATENT DOCUMENTS

| 5,263,136 | A | | 11/1993 | DeAguiar et al. | |
|---|---|---|---|---|---|
| 5,506,967 | A | | 4/1996 | Barajas et al. | |
| 5,579,444 | A | * | 11/1996 | Dalziel et al. | 700/259 |
| 5,604,825 | A | * | 2/1997 | Hirota et al. | 382/261 |
| 5,734,744 | A | | 3/1998 | Wittenstein et al. | |
| 5,751,860 | A | * | 5/1998 | Su et al. | 382/244 |
| 5,835,082 | A | * | 11/1998 | Perego | 345/555 |
| 5,999,189 | A | | 12/1999 | Kajiya et al. | |
| 7,039,241 | B1 | | 5/2006 | Van Hook | |
| 7,342,590 | B1 | | 3/2008 | Danskin et al. | |
| 2001/0037366 | A1 | * | 11/2001 | Webb et al. | 709/204 |
| 2002/0054763 | A1 | * | 5/2002 | Danis | 396/429 |
| 2004/0091160 | A1 | * | 5/2004 | Hook et al. | 382/239 |

OTHER PUBLICATIONS

US 6,336,289, 04/2002, Johns (withdrawn)

* cited by examiner

*Primary Examiner* — Bhavesh M Mehta
*Assistant Examiner* — Bernard Krasnic
(74) *Attorney, Agent, or Firm* — Kilpatrick Townsend & Stockton LLP (57) ABSTRACT

Methods, circuits, and apparatus for reducing memory bandwidth used by a graphics processor. Uncompressed tiles are read from a display buffer portion of a graphics memory and received by an encoder. The uncompressed tiles are compressed and written back to the graphics memory. When a tile is needed again before it has been modified, the compressed version is read from memory, uncompressed, and displayed. To reduce the number of unnecessary writes of compressed tiles to memory, a tile is only written to memory if it has remained static for some number of refresh cycles. Also, to prevent a large number of compressed tiles being written to the display buffer in one refresh cycle, the encoder can be throttled after a number of tiles have been written. Validity information can be stored for use by a CRTC. If a tile is updated, the validity information is updated such that invalid compressed data is not read from memory and displayed.

13 Claims, 9 Drawing Sheets

SCREEN COMPRESSION

CROSS-REFERENCES TO RELATED APPLICATIONS

This application is a divisional of co-owned and co-pending U.S. patent application Ser. No. 10/435,073, titled "Screen Compression," filed May 9, 2003, by Danskin et al. which is hereby incorporated by reference.

BACKGROUND

Graphics processors have become extremely powerful over the past several years and now incorporate many functions such as shading, texturing, and anti-aliasing that dramatically improve video images produced by computing systems. But it is desirable that a graphics processor achieve these improvements without consuming resources of the computing system, since the loss of these resources degrades system performance.

Graphics processors in a computing system receive graphics information from a central processing unit (CPU), and process the graphics information to generate pixel values. The pixel values, or pixels, are stored in a portion of a memory referred to as a display or frame buffer, and then are later retrieved from memory and sent to a display monitor for viewing.

But this memory is shared by other functions of the graphics processor, and in some computer system architectures with the CPU itself. Accordingly, the amount of pixel information retrieved from memory by the graphics processor reduces the amount of information that may be retrieved by other portions of the graphics processor and CPU.

Thus, to the extent that the memory bandwidth used by the graphics processor in reading pixel information is reduced, more memory bandwidth is available for other functions in the computing system, and overall system performance is improved. A simple solution is to store pixels in a separate memory in the graphics processor. But this requires a prohibitively large amount of memory on the processor, which makes the processor undesirably expensive. In short, access to the display buffer and memory in the graphics processor are each expensive, so it is desirable to reduce or limit them both.

Accordingly, what is needed are methods, circuits, and apparatus for reducing the bandwidth used by a graphics processor in reading pixel information from a display buffer. Also, it is further desirable to reduce this bandwidth without adding an excessive amount of circuitry or memory to the graphics processor.

SUMMARY

Accordingly, embodiments of the present invention provide methods, circuits, and apparatus for reducing the memory bandwidth required by a graphics processor performing a screen refresh. Uncompressed pixels are read from a display buffer memory and received by an encoder. Typically these pixels are grouped into tiles, though they may be handled as individual pixels. The uncompressed tiles are compressed or encoded and written to a portion of graphics memory that may be referred to as compressed memory. When the tiles are needed again, if they have not been modified or updated, the compressed tiles are read from memory, uncompressed, and displayed.

The memory bandwidth used by the graphics processor is reduced when compressed tiles are read instead of uncompressed tiles. This gain is mitigated by the extra write cycles to the memory required to store the compressed pixels. Also, extra graphics memory is required to store the compressed tiles.

To reduce the number of writes of compressed tiles to memory that do not result in a net memory bandwidth savings, a compressed tile is written to memory only if it has remained static, that is, it has not been updated, for a number (or a number in a range of numbers) of refresh cycles. Also, to prevent a large amount of compressed tiles being written to the graphics memory in one refresh cycle, the encoder can be throttled or disabled after a number or percentage of tiles have been written. Validity information for each tile can be stored in the graphics processor for use by the encoder and cathode-ray-tube controller (CRTC). If a tile is updated, the validity information can be updated to reflect this such that invalid compressed data is not read from memory and displayed.

An exemplary embodiment of the present invention provides a method of reducing memory bandwidth required for a screen refresh. The method includes reading a tile from a memory, the tile comprising a plurality of pixels, compressing the tile to form a compressed tile, storing the compressed tile in the memory, reading the compressed tile from the memory, and uncompressing the compressed tile.

A further exemplary embodiment of the present invention provides an integrated circuit. The integrated circuit includes a memory interface configured to receive compressed tiles and uncompressed tiles from a memory, an encoder configured to compress tiles and provide compressed tiles to the memory interface, and a decoder configured to decompress compressed tiles and provide decompressed tiles to a display.

Another exemplary embodiment of the present invention provides a method of compressing a tile including a plurality of pixels. This method includes reading the tile from a memory, compressing the tile, and storing the compressed tile in the memory.

Another exemplary embodiment of the present invention provides a method of reducing memory bandwidth required for a screen refresh. This method includes reading a tile from a memory during a first screen refresh, the tile comprising a plurality of pixels, determining whether the tile should be compressed, and if the tile should be compressed, compressing the tile and writing the compressed tile to the memory. During a second screen refresh, it is determined whether the tile has been updated after it was compressed, and if the tile has not been updated, the compressed tile is read from the memory. If the tile has been updated, the uncompressed updated tile is read.

Still another exemplary embodiment of the present invention provides an integrated circuit. This integrated circuit includes a memory interface, an encoder coupled to the memory interface, a first-in-first-out memory coupled to the memory interface, a decoder coupled to the first-in-first-out memory, a CRT controller coupled to the decoder, and a status memory coupled to the encoder and the CRT controller.

A better understanding of the nature and advantages of the present invention may be gained with reference to the following detailed description and the accompanying drawings.

DESCRIPTION OF EXEMPLARY EMBODIMENTS

Figure 1:
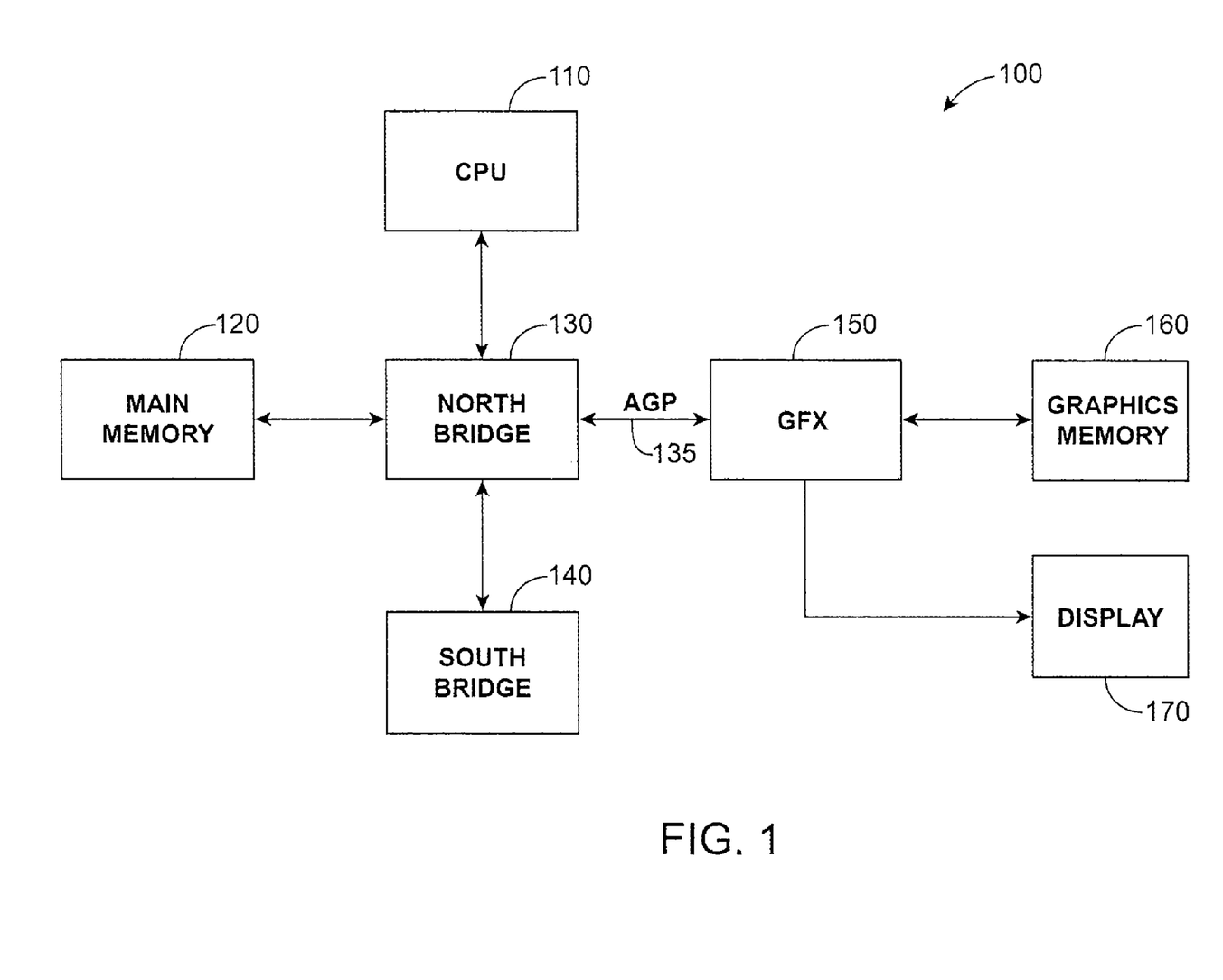
FIG. 1 is a block diagram of a computing system that benefits by incorporation of embodiments of the present invention.

FIG. 1 is a block diagram of a computing system 100 that benefits by incorporation of embodiments of the present invention. Included are a CPU 110, main memory 120, Northbridge 130, Southbridge 140, graphics processor 150, graphics memory 160, and display monitor 170. This figure, as with all the included figures, is shown for illustrative purposes only, and does not limit either the possible embodiments of the present invention or the claims.

The Northbridge 130 passes information from the CPU 110 to and from the main memory 120, graphics system 150, and Southbridge 140. Southbridge 140 interfaces to external communication systems through such connections as a universal serial bus (USB), serial, and FireWire ports. The graphics system 150 receives graphics information over the accelerated graphics port (AGP) bus 135 through the Northbridge 130 from CPU 110. The graphics system 150 interfaces to graphics memory 160 and provides pixels for display on monitor 170. The graphics memory 160 includes a display buffer which stores the pixels.

In this configuration, the graphics system 150 has its own graphics memory 160 and does not compete for access to the main memory 120 with the CPU 110. While this computing system is benefited by a reduction in the bandwidth of graphics memory 160 used by the graphics system 150, embodiments of the present invention particularly benefit computing systems using a shared memory.

Figure 2:
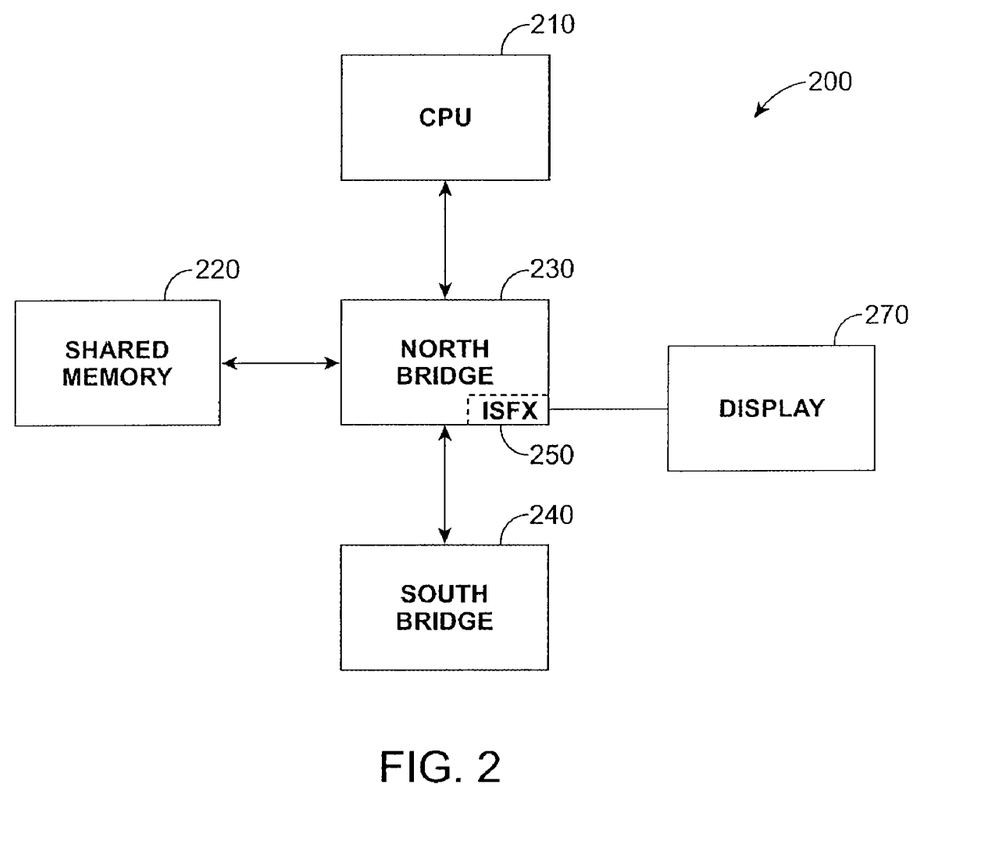
FIG. 2 is a block diagram of a computing system incorporating a shared-memory architecture that benefits by incorporation of embodiments of the present invention.

FIG. 2 is a block diagram of a computing system 200 incorporating a shared-memory architecture. Included are CPU 210, shared memory 220, Northbridge 230 including an integrated graphics processor 250, Southbridge 240, and display 270.

In this architecture, there is no separate AGP bus or separate graphics memory. Accordingly, the CPU 210 and integrated graphics system 250 compete for access to the shared memory 220 through the Northbridge 230. Thus, a reduction in the bandwidth to the shared memory 220 required by the integrated graphics processor 250 results in more memory bandwidth available for the CPU 210. If CPU 210 is able to access the shared memory 220 more readily, the overall performance of this computing system is improved.

Other computing system architectures may be benefited by the incorporation of embodiments of the present invention. For example, hub-architecture computing systems are also benefited by incorporation of embodiments of the present invention.

Figure 3:
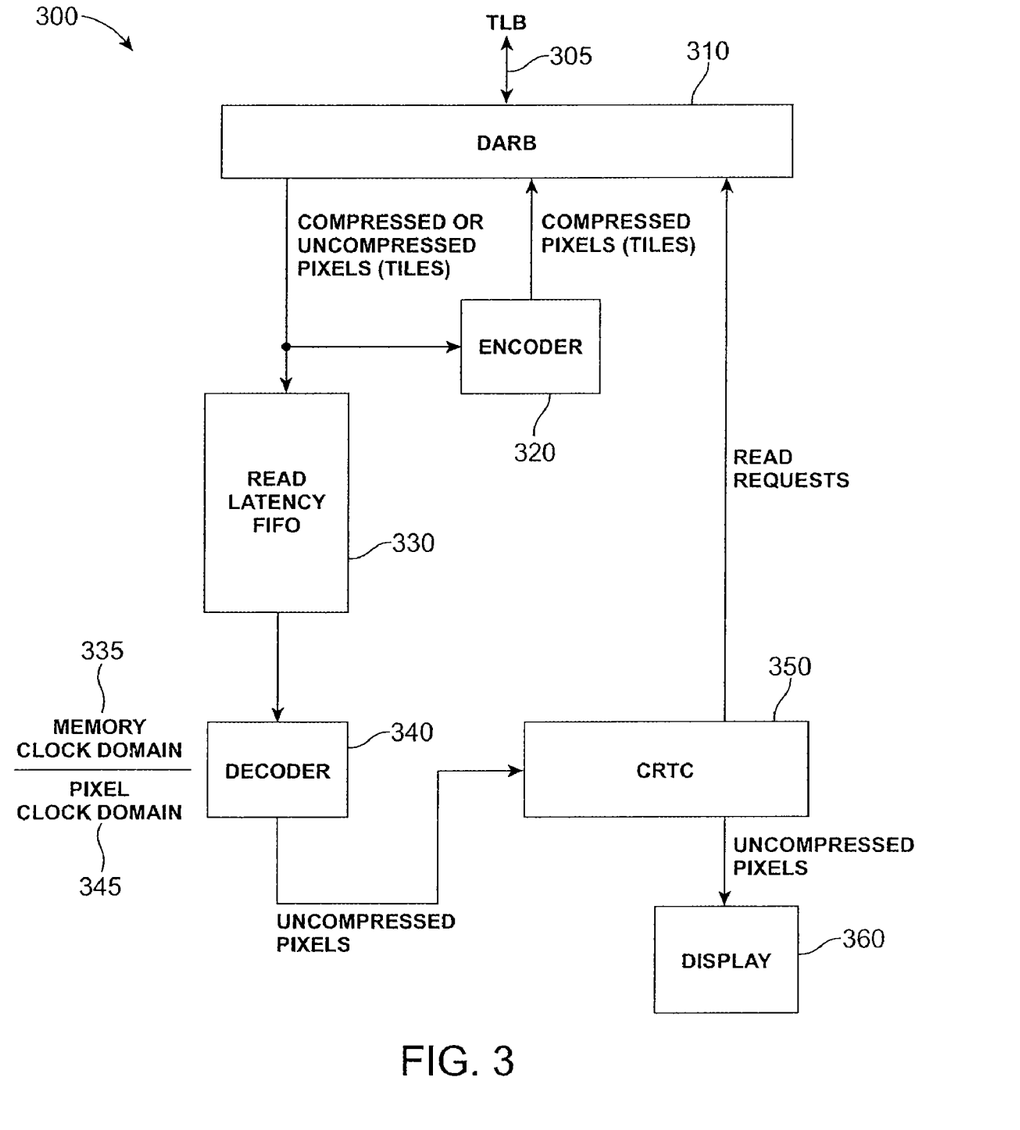
FIG. 3 is a block diagram of a portion of a graphics system consistent with an embodiment of the present invention.

FIG. 3 is a block diagram of a portion 300 of a graphics system consistent with an embodiment of the present invention. Included are a display arbiter or memory interface 310, encoder 320, read latency first-in-first-out memory (FIFO) 330, decoder 340, CRTC 350, and display 360. In a specific embodiment of the present invention, each of these blocks, except for the display 360, is incorporated on an integrated circuit. In a specific embodiment of the present invention, each of these blocks, except for the display 360, is integrated on an integrated circuit that forms at least a part of a Northbridge 230 for use in computing systems the same as, or similar to, the computing system in FIG. 2.

The display arbiter 310 writes and reads pixel data to and from a translation look-aside buffer, which is part of a graphics memory, over bus 305. The display arbiter provides pixels to the read latency FIFO 330 and the encoder 320. In a specific embodiment of the present invention, these pixels are received in groups referred to as tiles. In one embodiment, there are 1024 bytes in one uncompressed tile, which are allocated either as 256 four-byte pixels or 512 two-byte pixels. In this embodiment, these uncompressed tiles are divided into 16 byte portions, corresponding to either 4 four-byte pixels or 8 two-byte pixels, which are provided to the read latency FIFO 330. If a compressed tile is read, the number of compressed pixels read at one time is a function of the encoding length of the tile.

If a valid compressed version of a tile is available, that version is read by the display arbiter, otherwise an uncompressed tile is read. Read latency FIFO 330 provides a stream of compressed and uncompressed pixels to the decoder 340. The decoder 340 uncompresses the pixels and provides them to the CRTC 350. CRTC 350 provides uncompressed pixels for display to display monitor 360. CRTC 350 also provides read requests to the display arbiter 310, which responds by providing compressed and uncompressed pixels to the read latency FIFO 330 and encoder 320.

Again, encoder 320 receives uncompressed tiles from the display arbiter 310, compresses them, and provides compressed tiles to the display arbiter 310 for writing to the memory. The encoder may compress and write to memory each tile it receives. Alternately, specific embodiments of the present invention use one or more criteria to determine whether a tile should be compressed and written to memory. A specific embodiment encodes every tile and selectively writes them to memory, other embodiments selectively encode tiles and write every encoded tile to memory, while other embodiments selectively encode tiles and further selectively write encoded tiles to memory through the display arbiter 310. The criteria used by various embodiments of the present invention is further discussed below.

In a specific embodiment of the present invention, the compression performed by encoder 320 is lossless. Alternately, this encoding may be lossy, for example it may be lossy with little noise. Possible compression schemes include XOR, run-length coding, or rice coding. Alternately, a list of previous pixels and indices to them may be kept, and differences between previous and present pixels can be encoded. Alternately, one or more tiles may be encoded using multiple encoding methods—the encoding method that works best is then selected for use.

In a specific embodiment, the first tile of a pixel is read. A second pixel in the tile is read and a difference value for each of the colors of the first and second pixels is determined. This process continues until the end of the tile. The bits of the color differences are interleaved, then encoded to one of a number of lengths. For example, in a specific embodiment, the interleaved color differences are encoded to one of four lengths.

Other embodiments support other numbers of lengths. In a specific embodiment, the alpha value is simply discarded and not used. The first pixel and subsequent encoded pixel color differences are concatenated. These concatenated values are then padded with zeros to the nearest of several lengths. In the specific embodiment, the concatenated values are padded with zeros to the nearest of 14 lengths, the lengths separated by 64 bytes.

Specifically, after the first pixel in a tile is read, the color values in a subsequent pixel are subtracted from the corresponding color values of the previously read pixel according to the formula:

$$D_i = (P_i - P_{(i-1)}) \% 2^x, \qquad \text{(Equation 1)}$$

where $D_i$ is the difference in color values, $P_i$ is a color value for the current pixel, $P_{(i-1)}$ is a corresponding color value for the previous pixel, "%" is a symbol meaning modulus, "^" is a symbol meaning to the power of, and x is the number of bits in the color. In a specific embodiment, D, is calculated on a per color basis such that the difference value for one color is separate from the difference values of the other colors. Various embodiments of the present invention use different number of bits per pixel. For example, one embodiment uses 32 bit pixels with 8 bits per color, with 8 for an alpha value. Other embodiments utilize 16 bits per pixel. These embodiments may use 5 bits per color, with one bit for an alpha value, while another uses 5 bits for red and blue and 6 bits for green. In other embodiments, a different operation may be used. For example, the XOR operation may be used to determine color differences between pixels.

The bits of the resulting pixel differences are interleaved in the following pattern:

$$r_n g_n b_n \ldots r_1 g_1 b_1 r_0 g_0 b_0, \qquad \text{(Equation 2)}$$

where r, g, and b are the red, green, and blue components of the difference values found in equation 1, and n is the number of bits in a color. This interleaved value is then compressed. Again, in a specific embodiment, the interleaved value is compressed to one of four values. In other embodiments, this interleaving may be omitted, or varied. For example, only some of the MSBs may be interleaved.

Encoding is most effective if the variations between adjacent pixels is minor Pixels that are near in color to each other have a difference value where the most significant bits are zero, while the least significant bits (LSBs) are zero or one. By interleaving the colors in the pattern shown in equation 2, a difference value is generated where the most significant bits (MSBs) are zero. As such, the difference values may be encoded by dropping the most significant bits.

Again, in a specific embodiment, there are 32 bits per pixel, eight bits per color and 8 bits of alpha. In this embodiment, the alpha value is discarded, resulting in some immediate compression. The remaining interleaved 24 bits are encoded to one of four lengths, each length having a unique identifier.

Specifically, if the bits in the interleaved difference value are all zero, an identifier of 0 is used resulting in a 1 bit code. If the bits are not all zeros, but nine or fewer LSBs are needed, that is the higher ordered bits are all zero, a two bit identifier 10 is added to the nine LSBs thus forming an 11-bit code. If more than nine, but 15 or fewer LSBs are needed, a 110 is appended to the 15 LSBs forming an 18-bit code. If more than 15 LSBs are needed, a 111 is appended to the 24 bit difference thus forming a 27 bit code. It will be appreciated by one skilled in the art that other coding schemes are possible consistent with embodiments of the present invention.

The first pixel value and subsequent encoded pixel difference values are then concatenated. These concatenated values may then be padded with zeros by the insertion of leading zeros to one of a number of lengths. For example, they may be padded with zeros to one of 14 lengths. Again, in one specific embodiment, these lengths are separated by 64 bytes. Other specific implementations may be used consistent with embodiments of the present invention.

Since the coding used in a specific embodiment is lossless, some tiles may compress to a larger size than the original tile. In this case, these tiles should not be compressed and the uncompressed tiles should be used. Some embodiments of the present invention set a minimum compression, and tiles that compress larger than this threshold are not written to memory.

Again, in the specific example shown in FIG. 3, the compressed and uncompressed pixels are read from display arbiter 310 as tiles. The read latency FIFO receives these tiles, or portions of these tiles, and stacks them for use by the decoder 340.

Since the encoding process outlined above includes the step of subtracting each pixel from its previous pixel, decoding is performed by a specific embodiment of the present invention as a series of pixels, rather than as several pixels in parallel. That is, since each encoded pixel depends on the value of a previous pixel, they are decoded serially—to decode several values at once in parallel is difficult. The decoder then provides the uncompressed pixels to the CRTC 350. Uncompressed tiles received by the decoder are simply passed to the CRTC 350. The decoder 340 helps the FIFO 330 account for CPU latency since the decoder 340 is in series with the read latency FIFO 330.

Thus, the decoder receives tiles of compressed (and uncompressed) pixels and provides individual pixels in series at its output. This means that the clock rate at the output of the decoder is higher than the clock rate at its input. Accordingly, in this specific example, display arbiter 310, encoder 320, read latency FIFO 330, and portions of the decoder 340 and CRTC 350 are shown in a memory clock domain 335, while the remainder of the decoder 340 and CRTC 350, and the display 360 are shown in a pixel clock domain 345. In a specific embodiment, there are 8 pixels from a portion of a tile output from the FIFO 330 in one clock cycle, thus the pixel clock frequency is 8 times the memory clock frequency.

Figure 4:
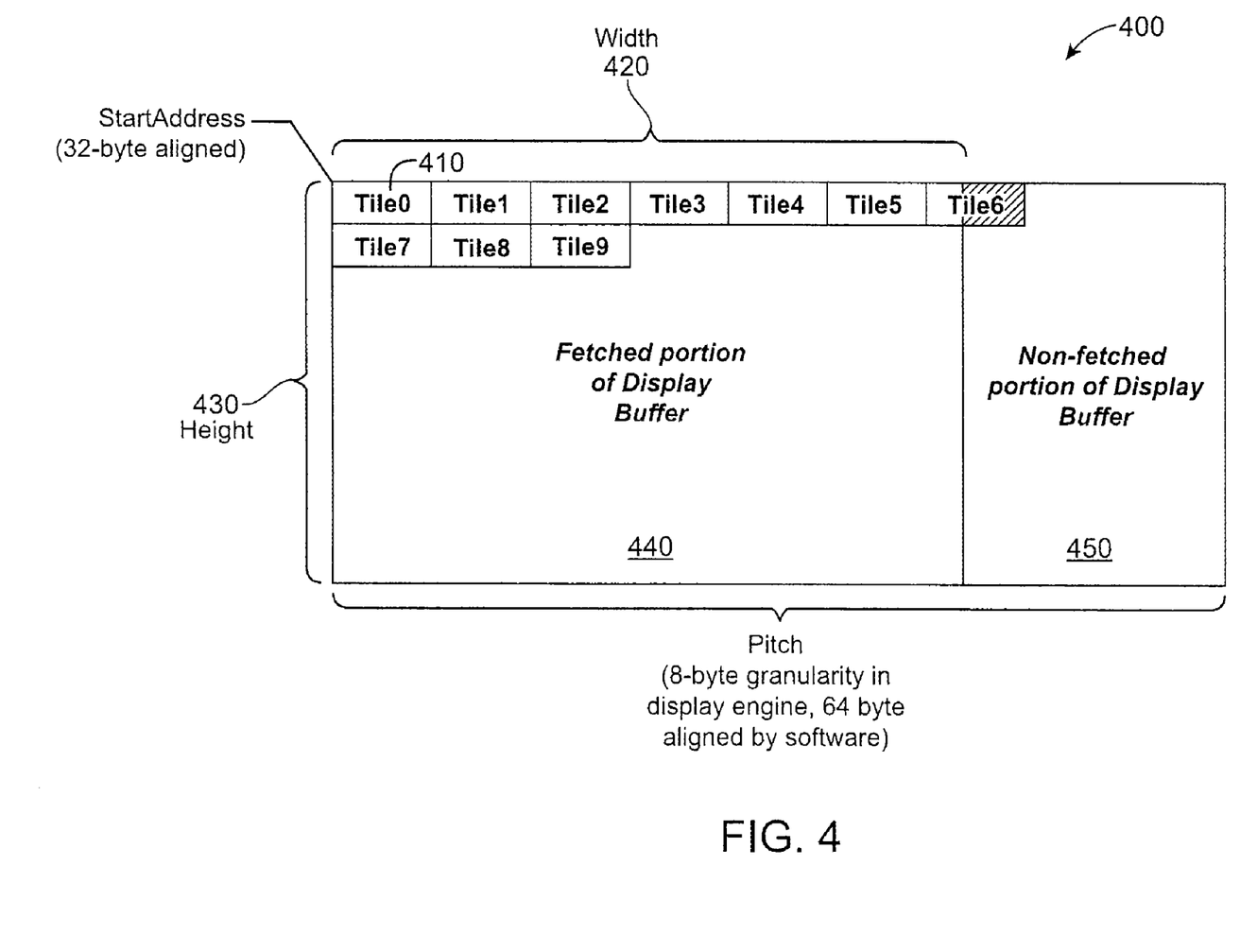
FIG. 4 shows an arrangement of tiles in a display buffer consistent with an embodiment of the present invention.

FIG. 4 shows an arrangement of tiles in a display buffer 400 according to an embodiment of the present invention. The display buffer has a width or stride 420 and a height 430. The display buffer is divided into fetched 440 and non-fetched 450 portions. This display buffer may be a portion of a shared or graphics memory. Each tile 410 holds several pixels, and is 1×N pixels in size, N being the number of pixels in a tile. In a specific embodiment, there are 1024 bytes in a tile, which corresponds to 256 four-byte pixels or 512 two-byte pixels. In other embodiments the size of a tile may vary. For example, the size of a tile may be N×M pixels in size, where N and M are any value. Alternately, different tiles may be of different sizes. The width needed by the display may not match an integral number of tiles, so partial or abbreviated tiles are supported.

Compressed tiles may be stored in a portion of the same shared or graphics memory as this display buffer. The compressed tiles are stored in a portion of memory referred to as compressed memory. In a specific embodiment, this compressed memory is divided into slots, where each slot stores one compressed tile. The compressed memory may be arranged linearly, that is in one dimension. Alternately, the compressed memory may be arranged in two dimensions, for example, the slots may be arranged the same or similar to the arrangement of tiles shown in FIG. 4. Alternately, other arrangements may be used, for example where the number of slots in the X and Y directions do not match the number of tiles in the X and Y directions as shown in FIG. 4. Other arrangements are also possible, for example the compressed memory may be in a separate memory from the display buffer.

Depending on the compression length, not all the bits in a particular slot may be used. That is, some of the slots may be padded, for example with zeros. Also, the slot size may be changed, either dynamically or at start-up, and the minimum allowable compression may be changed accordingly.

If displayed image was updated too frequently, the encoder would keep encoding pixels and writing them to memory, never to be used. This would mean an increase in memory accessing, not a reduction as hoped. Accordingly, in a specific embodiment of the present invention, if a pixel in a tile is modified, the tile is not compressed until it has not been written to for a number of screen cycles.

Figure 5:
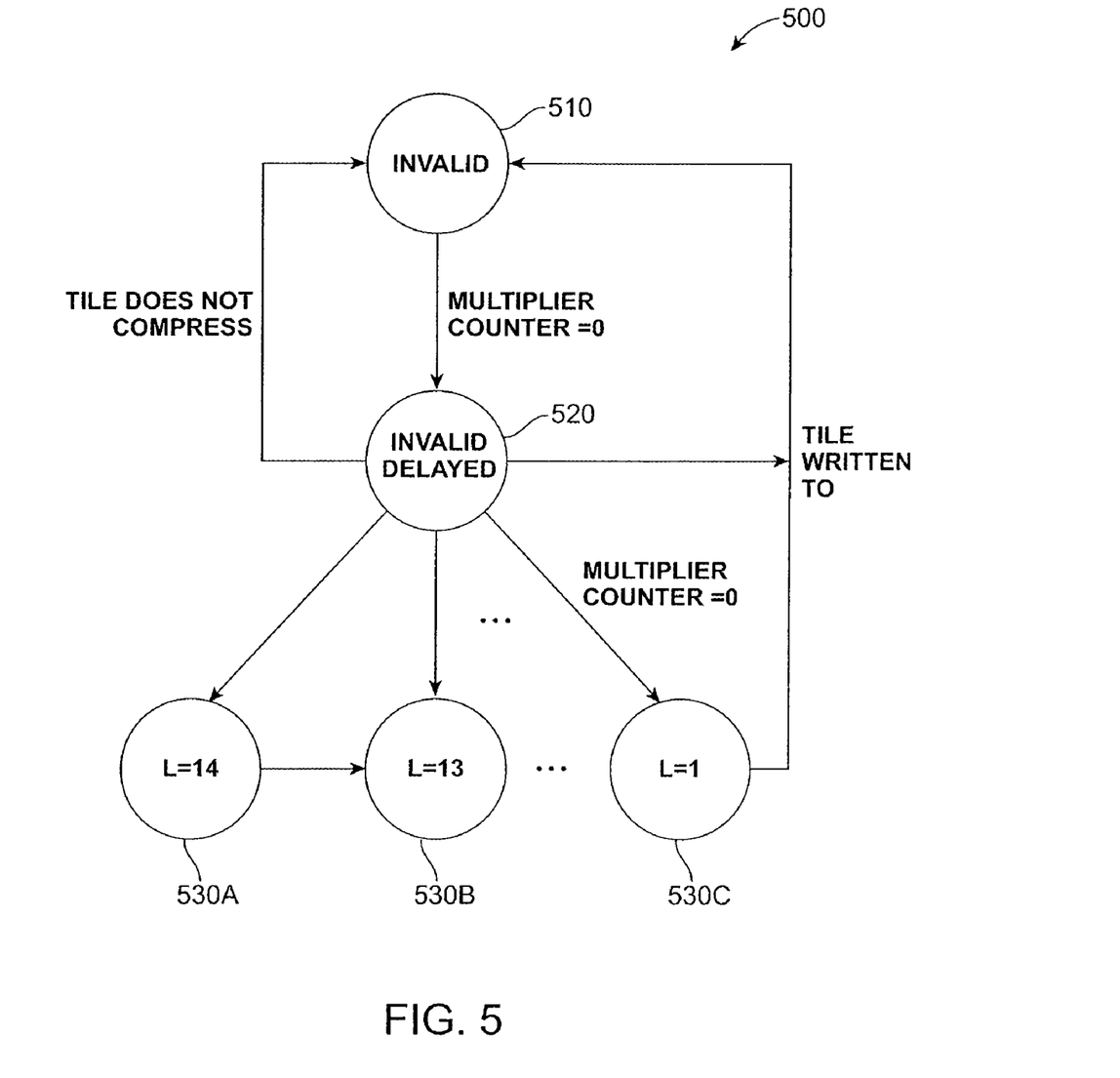
FIG. 5 is a state diagram showing a delay in encoding according to an embodiment of the present invention.

FIG. 5 is a state diagram 500 showing this delay in encoding according to an embodiment of the present invention. In this specific embodiment, a four-bit word is associated with each tile. Each four-bit word defines sixteen states, which in turn define fourteen compressed states—corresponding to the fourteen possible encoded tile lengths—and two invalid states, specifically the invalid and delayed invalid states. In other embodiments, a different number of valid and invalid states may be defined by fewer than 4, 4, or more than 4 bits. For example, there may be one compressed state, such that all compressed tiles are of the same length. In this case, the valid and invalid states may be defined with a single bit, though more bits may be used if additional invalid states are desired.

A counter controls the change in state from an invalid state to a delayed invalid state to a compressed state. This counter counts display cycles, or vertical retraces. The counter is free running from an initial value referred to as "multiplier" to zero (or zero to "multiplier"), and when it reaches zero (or any other specific count) the state changes, and the counter is reset or returns to its initial value where it begins counting again. In a specific embodiment of the present invention, the counter repeatedly counts from three to zero.

Accordingly, after a pixel in a tile has been updated, the tile may be encoded if no pixel in it changes state for a number of screen cycles, the number being between the value multiplier plus one and twice the multiplier value. More specifically, if all the pixels in a tile have not changed state for at least this number of cycles, the tile can be compressed.

Specifically, if the tile is at invalid state 510, the tile should not be compressed and written to memory. Alternately, the tile may be compressed but not written to memory. The counter has a value between zero and multiplier, inclusive. At each screen refresh, for example during vertical retrace, the counter is incremented (or decremented) by one. When the counter reaches a predetermined count, such as zero, the tile changes state to invalid delay state 520.

The counter is reset to its initial value, and again, the counter counts screen refreshes to the predetermined number, zero in this example. If any pixel in the tile is written to, the state of the tile returns to the invalid state 510. If no pixel in the tile is written to before the counter reaches its predetermined value, the tile is compressed, that is it changes states to one of the fourteen compressed states 530. Also, if the tile does not compress, or does not compress below a predetermined threshold, it returns to the invalid state 510.

In an alternate embodiment, if a tile does not compress, or does not compress below a threshold, the tile goes to a third invalid state, where it stays until it is updated, after which it returns to invalid state 510. In that case, there are only 13 defined compression lengths, since one state is needed for the third invalid state.

Figure 6:
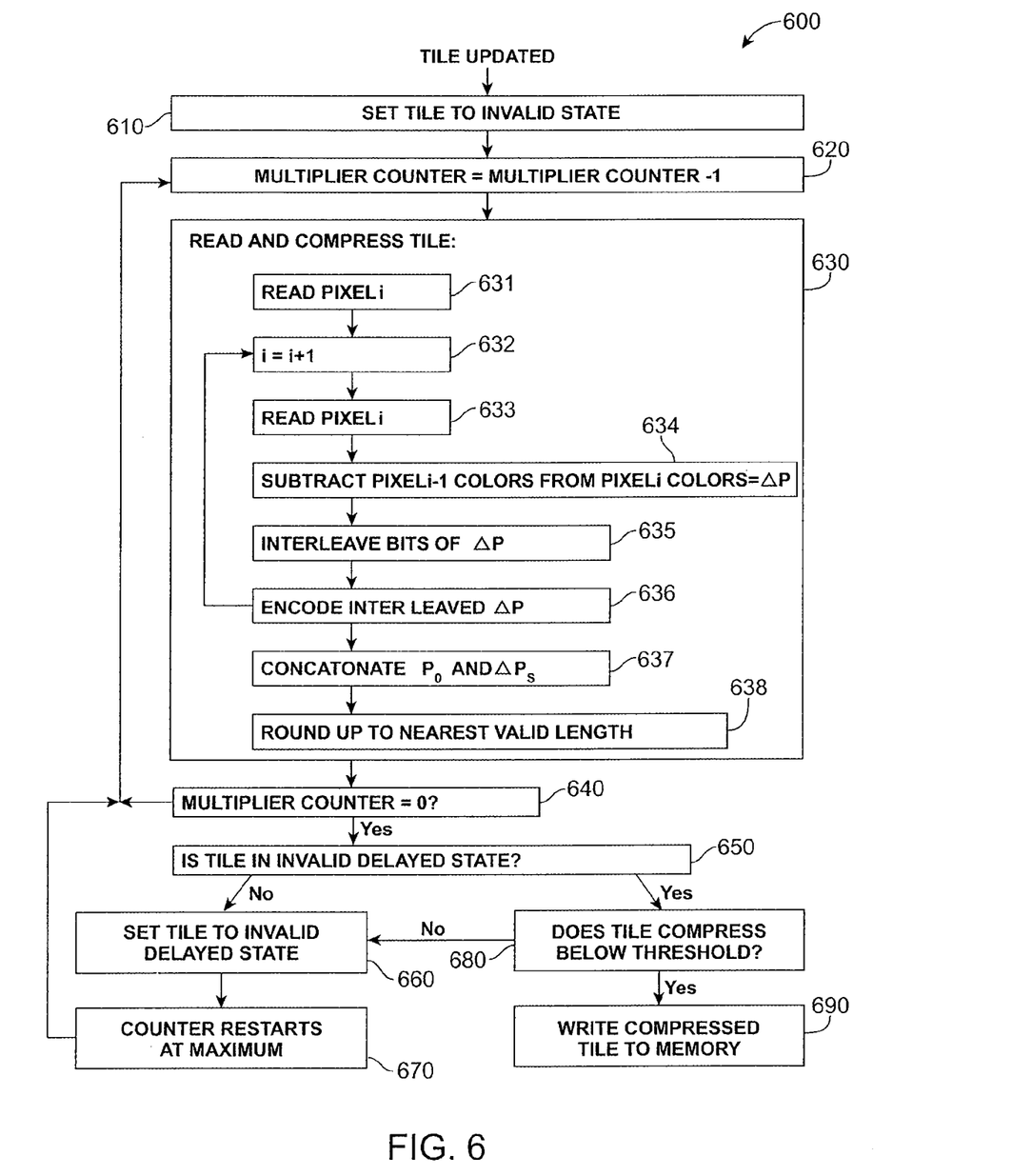
FIG. 6 is a flow chart showing the delay in encoding used by a specific embodiment of the present invention.

FIG. 6 is a flowchart 600 showing the delay in encoding and the encoding used by a specific embodiment of the present invention. In act 610, the tile is set to the invalid state. This state is reached whenever the tile is updated, or if the tile does not properly compress. In act 620, a screen refresh has occurred, so the counter value, "multiplier counter," is decremented by one. Alternately, the counter may be incremented by one. In act 630, the tile is read and compressed.

Specifically, a first pixel is read in act 631. In act 632, a counter is incremented by one, and a corresponding subsequent pixel is read in act 633. A difference value between these pixels is taken in act 634, for example, using equation 1 above, or other appropriate operation. The bits of the difference value are interleaved, using equation 2 above or other appropriate pattern in act 635. In act 636, the interleaved value is encoded, for example, some or all the alpha value and MSBs may be truncated as above. When all pixels in the tile have been read, the first pixel and encoded difference values are concatenated in act 637. In act 638, this value is padded with zeros to the nearest valid length.

In act 640 it is determined whether the counter value has reached zero, or some other predetermined value. If not, the next screen refresh decrements the counter by one in act 620. Again, in this example, the tile is encoded each time it is read. In other embodiments, the tile is only encoded when it is going to be written to memory.

If the counter has reached zero, it is determined if the tile is set to the invalid delayed state in act 650. If not, the tile is set to the invalid delayed state in act 660, the counter restarts in act 670, and when refreshed, the counter is decremented in act 620. If the tile is already in the invalid delayed state, it is determined if the tile compressed below an acceptable threshold in act 680. If not, the tile returns to the invalid delayed state. If it has, the compressed tile may be written to memory in act 690.

In a specific embodiment, the counter is free running, that is, it is not synchronized to write updates for any of the tiles. Also, each tile shares one global counter. Accordingly, when a tile moves to the invalid state, the counter may be anywhere between its maximum value and 0. Thus, the transition from invalid to delayed invalid may be anywhere from one to a "multiplier" number of screen refreshes. The transition from delayed invalid to compressed is a "multiplier" number of screen refreshes, thus, the total number of screen refreshes after a tile has been updated to when it is compressed is between one plus multiplier and twice the value of multiplier.

If several pixels are changed simultaneously, but then are not changed for this requisite time, their compressed tiles could all be written to memory during the same screen cycle. This could flood the memory with write updates. Accordingly, the encoder or display arbiter may be throttled to avoid this. That is, only a percentage or number of compressed tiles that can be written to memory are actually written to memory, while the rest are delayed and written to memory during following screen cycles. For example, only the first 100 compressed tiles may be written to memory. Other compressed tiles that would otherwise be written to memory are moved to the delayed invalid, or invalid states.

FIGS. 7A-7D show how throttling and the delay multiplier work together to limit the number of compressed tiles that are written to memory during any one screen refresh.

Figure 7A:
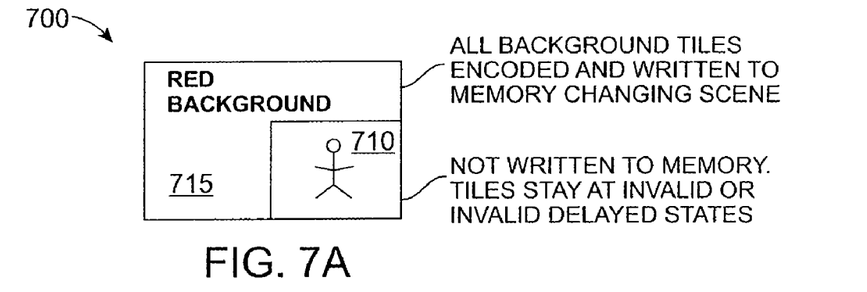
FIGS. 7A-7D show how throttling and the delay multiplier work together to limit the tiles being compressed and written to memory during any one screen refresh.
Figure 7B:
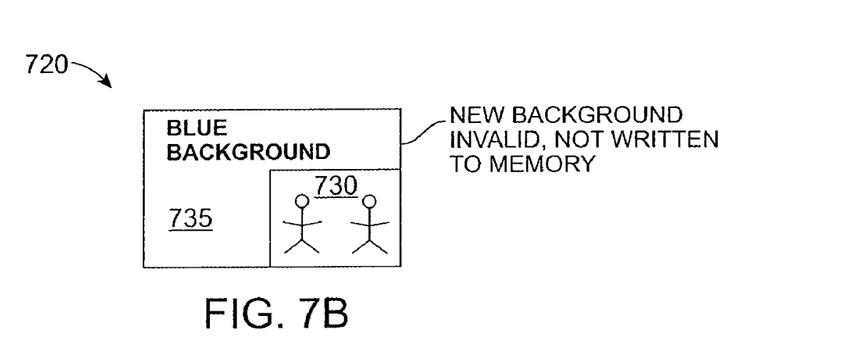

FIG. 7A illustrates a screen 700 having portions 710 and 715. Screen portion 710 is a scene that is changing often enough that its compressed tiles are not written to memory. Again, in other embodiments, these tiles are neither compressed nor written to memory. The compressed tiles that include the pixels for this scene stay in either the invalid or invalid delay states. Portion 715 is a background portion, which in this example is red. In this example, all the tiles including the pixels for this background have been compressed and written to memory. While screen 700 is displayed, much of the image is formed by compressed tiles, specifically the background portion 715. Accordingly, the memory bandwidth required is reduced. Further, there is no gain to be made by writing tiles in the changing scene portion 710 to memory, since compressed tiles are updated before they can be used a sufficient amount to make up for the memory bandwidth that is lost by writing them to memory. In FIG. 7B, the previously red background changes to a blue background 735 in screen 720, while the changing screen portion 710 changes to an image shown as screen portion 730. At this time, there are no valid compressed tiles in memory. At this point, there is no reduction in required memory bandwidth since no encoded tiles are being used, but there is no loss since no encoded tiles are being written to memory.

Figure 7C:
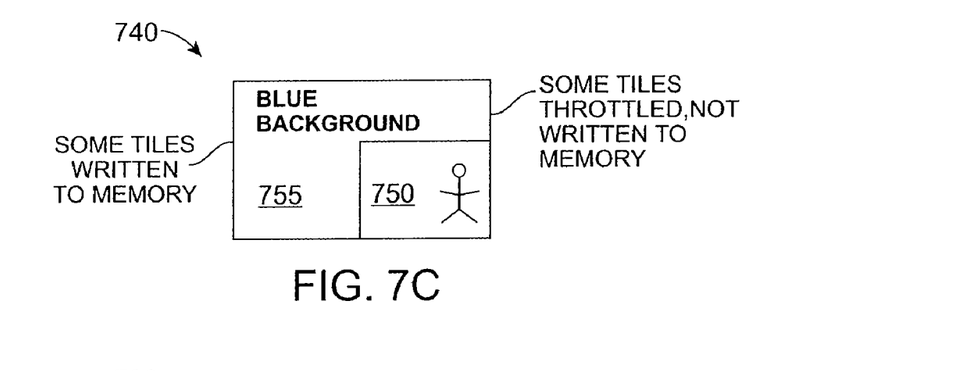
Figure 7D:
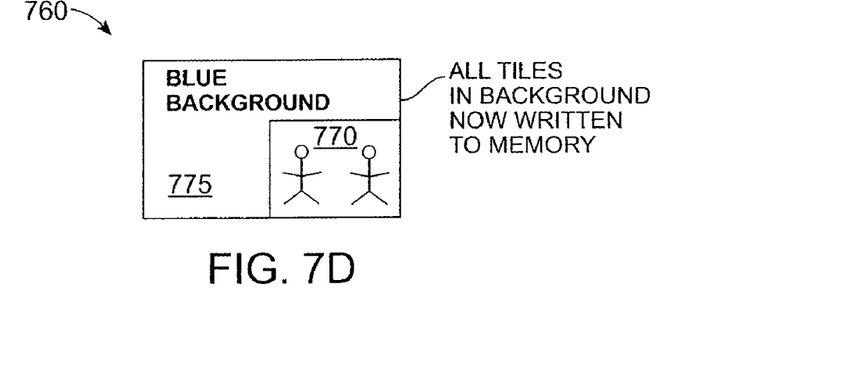

In FIGS. 7C, the blue background portion 755 in screen 740 has not changed for several screen refreshes, while screen portion 750 has changed. In this case, some of the compressed tiles have been written to memory, while others, in an attempt to not flood the memory, have been throttled and are not yet written. In this way, the large memory bandwidth that would be required if all the compressed blue tiles were written to memory at once is deferred among several screen refresh cycles. Also, it prevents much of the waste that would occur if the blue background 755 that is now blue was to change again. In FIG. 7D, the background portion 775 in screen 760 has been stable long enough such that all tiles are now written to memory, while tiles in the changing screen portion 770 remain in the invalid or invalid delay states and are not written to memory. Since much of the screen is again made up of compressed tiles, the bandwidth to the graphics or shared memory required by the graphics processor is greatly reduced.

Again, if a pixel in a tile is updated, the compressed version of that tile is no longer valid and should not be used. In typical graphics processors, several graphics engines can modify or update pixel information. In a specific embodiment of the present invention, a write snoop block monitors the engines that may modify a pixel in memory. When a pixel is modified, its tile is set to the invalid state.

Figure 8:
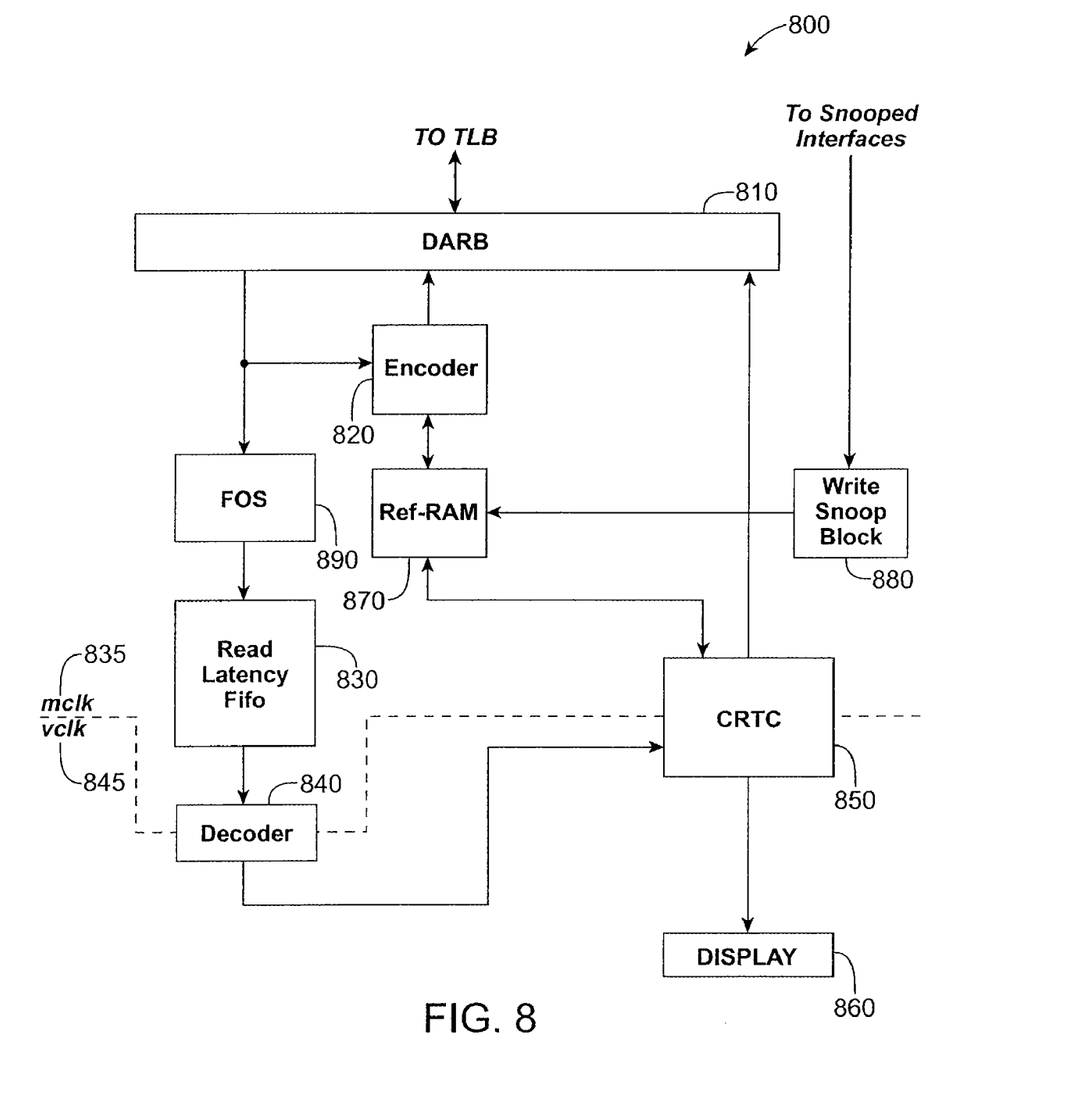
FIG. 8 is a system block diagram including a memory for storing a four-bit word associated with each tile, and a write snoop block in accordance with an embodiment of the present invention.

FIG. 8 is a block diagram of system 800 including a status memory, referred to as a ref-ram, that stores four-bit words that are associated with each tile, and a write snoop block. If a snooped interface updates a tile, the write snoop block invalidates the compressed version of the tile by updating the ref-ram.

In one embodiment of the present invention, there are three interfaces that may write to the display memory. Accordingly, three interfaces may need to access the write snoop block at the same time. To avoid contention, FIFOs and arbitration circuit are used. In other embodiments, there may be a different number of interfaces that may update pixel information in the display memory. Included in FIG. 8 are display arbiter 810, encoder 820, read latency FIFO 830, decoder 840, CRTC 850, display 860, ref-ram 870, write snoop block 880, and filter-on-scan-out (FOS) 890. In a specific embodiment of the present invention each of these blocks, except for the display 860, is incorporated on an integrated circuit. In a specific embodiment of the present invention, each of these blocks, except for display 860, is incorporated on a integrated circuit that forms in part of a Northbridge 230 in computing system that is the same, or similar to, the computing system of FIG. 2. Portions of system 800 are in an mclk domain 835, while portions of system 800 are in a vclk domain 845.

Display arbiter 810 provides compressed and uncompressed tiles to FOS 890 and encoder 820. Typically, FOS 890 is active only during three-dimensional operations. While three-dimensional operations are taking place, the display alternates between left and right images. Accordingly, if only one display buffer is used during three-dimensional operations, the tiles do not compress, and embodiments of the present invention can be disabled. If, however, separate right and left display buffers are kept, then the encoder and related circuits can be used. If the image displayed is two dimensional, FOS 890 is disabled, and compressed tiles pass directly to the read latency FIFO 830. Again, the read latency FIFO 830 stacks the compressed and uncompressed tiles for use by the decoder 840. Decoder 840 and compresses the compressed tiles into pixels and provides them to the CRTC 850, which in turn provides them for display by the display monitor 860.

The various interfaces that can update pixel information in the display buffer are monitored by the write snoop block 880. The write snoop block updates the contents of the ref-ram 870. In a specific embodiment of the present invention, the ref-ram stores four-bit words, one for each tile stored in the display memory. The encoder 820 checks the ref-ram contents for each uncompressed tile its receives from the display arbitrator 810. If the ref-ram contents indicate that the tile may be encoded, and if the encoder is not otherwise throttled as discussed above, the encoder compresses the uncompressed tile and provides to the display arbiter 810 for writing to the display buffer. The CRTC 850 also monitors the ref-ram 870. If the CRTC needs a tile, it checks the state of the compressed version of the tile. If the state shows that the tile is valid and compressed, the compressed tile is read from the display buffer, otherwise the larger uncompressed tile is retrieved.

Figure 9:
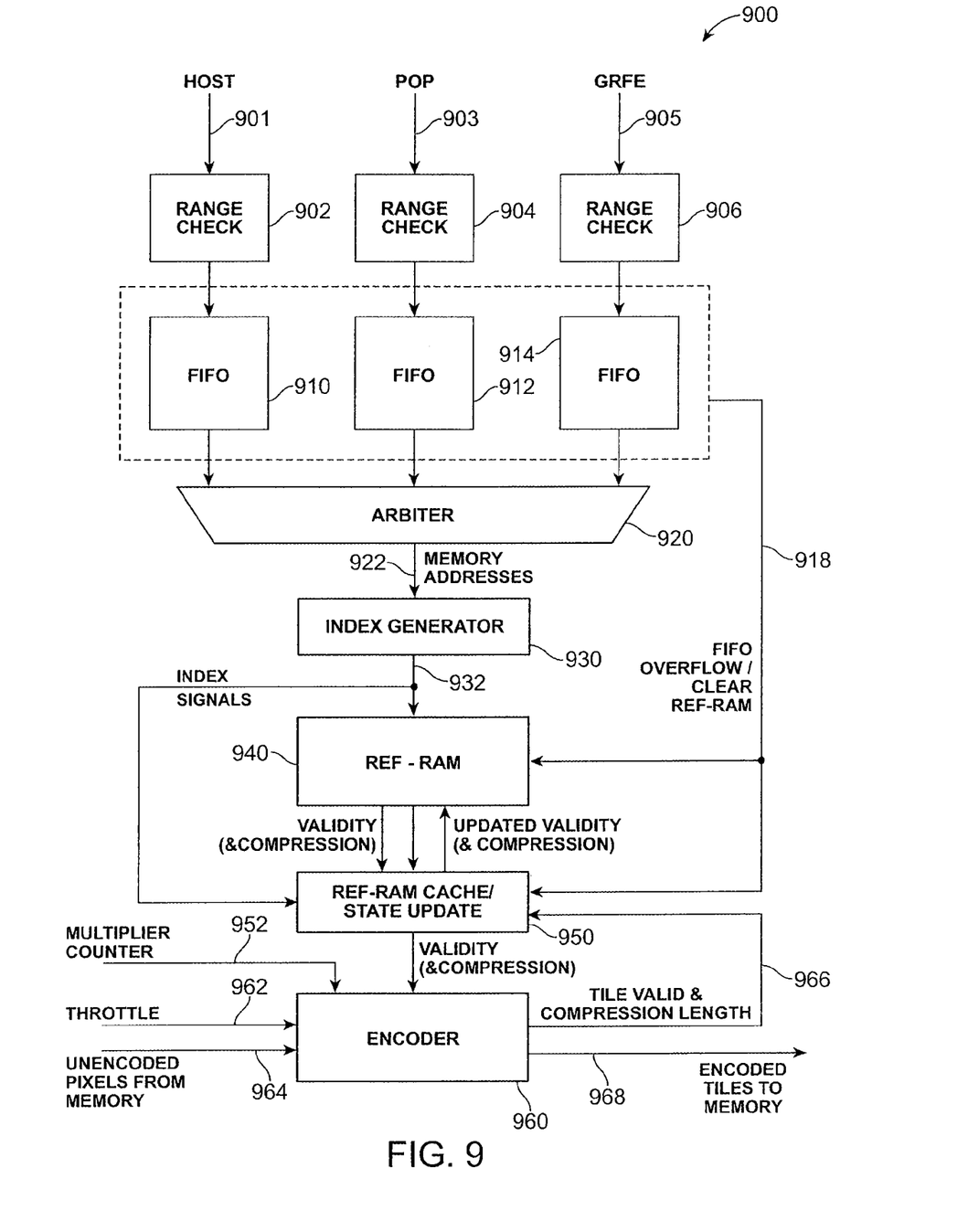
FIG. 9 is a block diagram showing a write snoop block, memory, and encoder in more detail.

FIG. 9 is a block diagram of system 900 showing the snoop block, ref-ram, and encoder in more detail. Included are range check circuits 902, 904, and 906, FIFOs 910, 912, and 914, arbiter 920, index generator 930, ref-ram 940, ref-ram cache 950, and encoder 960.

The host, raster operations (ROP), and graphics front end (GRFE) can each write pixels to memory. When they do, the memory addresses of the updated pixels are provided to range check circuits 902, 904, and 906 on lines 901, 903, and 905. The range check circuits verify that the updated pixel is in the visible portion of the display buffer, and if it is, passes the address to the corresponding FIFO 910, 912, or 914.

It is undesirable to display invalid compressed pixels. This may happen if the FIFOs become overfilled. Thus, if a high-water mark in one of the FIFOs is reached, a FIFO overflow signal on line 918 is asserted, and the ref-ram and ref-ram cache are cleared. Also, certain commands, such as screen refresh, pan, scroll, and resize can be set to clear the ref-ram and ref-ram cache. Once the ref-ram and its cache are cleared, there are no valid compressed tiles, each tile is in the invalid state. The FIFOs feed an arbiter 920, which provides addresses that have been updated or written to on lines 922 to an index generator 930. The index generator 930 determines which tiles or indices were "dirtied," that is made invalid, by the write to the provided address. The index generator 930 generates index signals on line 932 that set corresponding four-bit words in the ref-ram and ref-ram cache to the invalid state.

Lines in the ref-ram 940 are cached in the ref-ram cache 950, and read by the encoder 960 and CRTC. In one embodiment, the cache line 950 holds status bits for 8 tiles. The encoder 960 receives uncompressed pixels from memory on line 964. The encoder also receives a throttle signal on line 962, which disables the encoder when it is asserted. Again, the throttle signal is asserted if a certain number or percentage of tiles are encoded and written to memory during a single screen refresh. The encoder 960 receives validity information from the ref-ram cache 950. If the uncompressed tile received on lines 964 are at the invalid delayed state, the multiplier counter on line 952 is at zero, and the encoder is not throttled, the uncompressed pixels are compressed and provided on line 968 to the display arbiter to be written to memory. The encoder then updates the ref-ram tile state with tile valid and compression length information on line 966.

In an alternate embodiment, only one bit, referred to as a dirty or invalid bit is kept in the ref-ram, while bits defining the compression length are kept in the display buffer, for example, as part of the tiles. Where the circuitry of FIGS. 8 and 9 are incorporated on an integrated circuit (except for the display 860 and display buffer), this reduces the on-chip memory required and reduces integrated circuit area and costs, though it does increase the memory bandwidth used by the graphics processor.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of reducing memory bandwidth required for a screen refresh, the method comprising:
    reading a tile from a memory, the tile comprising a plurality of pixels;
    determining whether the tile should be compressed, and if the tile should be compressed, then compressing the tile to form a compressed tile;
    storing the compressed tile in the memory;
    reading the compressed tile from the memory; and
    uncompressing the compressed tile; and
    if the tile should not be compressed, then not compressing the tile,
    wherein compressing the tile comprises:
    reading a first pixel in the tile, the first pixel comprising a first plurality of color values;
    reading a second pixel in the tile, the second pixel comprising a second plurality of color values;
    determining a difference between the first plurality of color values of the first pixel and the second plurality of color values of the second pixel to generate a first plurality of difference values;
    interleaving bits of the first plurality of difference values to generate a first interleaved value;
    encoding the first interleaved value to generate a first encoded value; and
    concatenating the first pixel and the first encoded value, and
    wherein the tile should be compressed if it has not been updated for a first number of screen refreshes, the first number having a value in a range of numbers between a second number plus one and twice the second number, and fewer than a third number of tiles have already been compressed during the first screen refresh.

2. The method of claim 1 wherein determining a difference between the first plurality of color values of the first pixel from the second plurality of color values of the second pixel comprises:
    exclusive ORing each of the first plurality of color values of the first pixel with a corresponding one of the second plurality of color values of the second pixel.

3. The method of claim 1 wherein determining a difference between the first plurality of color values of the first pixel from the second plurality of color values of the second pixel comprises:
    subtracting each of the first plurality of color values of the first pixel with a corresponding one of the second plurality of color values of the second pixel.

4. The method of claim 1 wherein the compressing the tile is done using a lossless compression.

5. The method of claim 1 wherein the compressing the tile is done using a lossy compression.

6. The method of claim 1 wherein the tile is compressed after the tile has not been modified for a first number of screen refreshes.

7. The method of claim 6 wherein the compressed tile is read from the memory only if the tile is not modified after it is compressed.

8. A method of compressing a tile including a plurality of pixels comprising:
    reading the tile from a memory;
    determining whether the tile should be compressed, and if the tile should be compressed, then compressing the tile; and
    storing the compressed tile in the memory,
    wherein compressing the tile comprises:
    subtracting color values for a pixel in the tile from color values for a previous pixel to generate color difference values comprising a plurality of bits;
    interleaving the plurality of bits of the difference values to generate an interleaved difference value; and
    compressing the interleaved difference value; and
    if the tile should not be compressed, then not compressing the tile,
    wherein the tile should be compressed if it has not been updated for a first number of screen refreshes, the first number having a value in a range of numbers between a second number plus one and twice the second number, and fewer than a third number of tiles have already been compressed during the first screen refresh.

9. The method of claim 8 wherein the tile is compressed if the tile has not been updated for a number of screen refreshes.

10. The method of claim 8 further comprising reading the compressed tile from memory if the tile is not updated after it is compressed.

11. A method of reducing memory bandwidth required for a screen refresh, the method comprising:
    during a first screen refresh, reading a tile from a memory, the tile comprising a plurality of pixels;
    determining whether the tile should be compressed; and
    if the tile should be compressed, compressing the tile and writing the compressed tile to the memory;
    during a second screen refresh, determining whether the tile has been updated after it was compressed, and
    if the tile has not been updated, reading the compressed tile from the memory; otherwise reading the tile from the memory; and if the tile should not be compressed, then not compressing the tile,
wherein the tile should be compressed if it has not been updated for a first number of screen refreshes, the first number having a value in a range of numbers between a second number plus one and twice the second number, and fewer than a third number of tiles have already been compressed during the first screen refresh.

12. The method of claim 11 wherein the tile should be compressed if it has not been updated for a first number of screen refreshes.

13. The method of claim 11 where compressing the tile is done using a lossless compression.

* * * * *